US005566388A

United States Patent [19]
Brame et al.

[11] Patent Number: 5,566,388
[45] Date of Patent: Oct. 15, 1996

[54] RF TRUNKING MULTISITE SWITCH CONFIGURATION AND DIAGNOSTICS INTERFACE

[75] Inventors: Charles P. Brame; Timothy F. Cree; Stephen R. Downs; Philip C. Gulliford; Wim A. Imron, all of Forest; James L. Teel, Jr., Goode, all of Va.

[73] Assignee: Ericsson Inc., Research Triangle Park, N.C.

[21] Appl. No.: 183,250

[22] Filed: Jan. 19, 1994

Related U.S. Application Data

[63] Continuation of Ser. No. 787,875, Nov. 5, 1991, abandoned, which is a continuation-in-part of Ser. No. 573,977, Aug. 28, 1990, abandoned.

[51] Int. Cl.$^6$ ............................................. H04J 1/14
[52] U.S. Cl. .................... 370/95.1; 370/110.1; 379/63; 455/53.1
[58] Field of Search ................. 370/95.1, 95.2, 370/95.3, 85.1, 85.7, 85.8, 85.9, 85.11, 67, 110.1, 110.2, 110.4, 68.1; 455/17, 53.1, 54.1, 15, 34.1, 56.1; 379/59, 63

[56] References Cited

U.S. PATENT DOCUMENTS

| | | | |
|---|---|---|---|
| 4,012,597 | 3/1977 | Lynk, Jr. et al. | 179/41 |
| 4,144,412 | 3/1979 | Ito et al. | 179/2 EB |
| 4,268,722 | 5/1981 | Little et al. | 179/2 EB |
| 4,308,429 | 12/1981 | Kai et al | 179/2 EB |
| 4,550,402 | 10/1985 | Gable et al. | 370/85 |
| 4,578,815 | 3/1986 | Persinotti | 455/15 |
| 4,603,418 | 7/1986 | Townsend | 370/85 |
| 4,698,805 | 10/1987 | Sasuta et al. | 370/97 |
| 4,792,948 | 12/1988 | Hangen et al. | 370/95 |
| 4,870,408 | 9/1989 | Zdunek et al. | 340/825.03 |
| 4,926,496 | 5/1990 | Cole et al. | 455/34.1 |
| 4,984,290 | 1/1991 | Levine et al. | 379/63 |
| 4,989,204 | 1/1991 | Shimizu et al. | 370/94.1 |
| 5,008,953 | 4/1991 | Dahlin et al. | 455/33 |
| 5,036,531 | 7/1991 | Spear | 379/59 |
| 5,058,199 | 10/1991 | Grube | 455/34.1 |
| 5,095,528 | 3/1992 | Leslie et al. | 455/15 |
| 5,117,501 | 5/1992 | Childress et al. | 455/11.1 |
| 5,123,110 | 6/1992 | Grube | 455/33.1 |
| 5,127,101 | 6/1992 | Rose, Jr. | 455/51.1 |
| 5,157,709 | 10/1992 | Ohteru | 379/63 |
| 5,195,090 | 3/1993 | Bolliger et al. | 370/94.1 |
| 5,239,538 | 8/1993 | Teel et al. | 370/85.11 |
| 5,253,253 | 10/1993 | Brame et al. | 370/85.11 |
| 5,283,817 | 2/1994 | Hara et al. | 379/63 |
| 5,295,178 | 3/1994 | Nickel et al. | 370/110.2 |

OTHER PUBLICATIONS

Motorola Centracom Series II (Control Center Systems) Brochure, Jun. 5, 1985.

*Primary Examiner*—Benedict V. Safourek
*Assistant Examiner*—Chau T. Nguyen
*Attorney, Agent, or Firm*—Nixon & Vanderhye

[57] ABSTRACT

In a multisite radio frequency (RF) signal transmission system, a multisite switch routes audio and data information throughout the system. This switch has a node through which a system manager and system operator can configure and diagnose each site, console and channel in the (RF) system.

12 Claims, 5 Drawing Sheets

SWITCH CONTROLLER CARD ARCHITECTURE

MULTI-SITE ARCHITECTURE

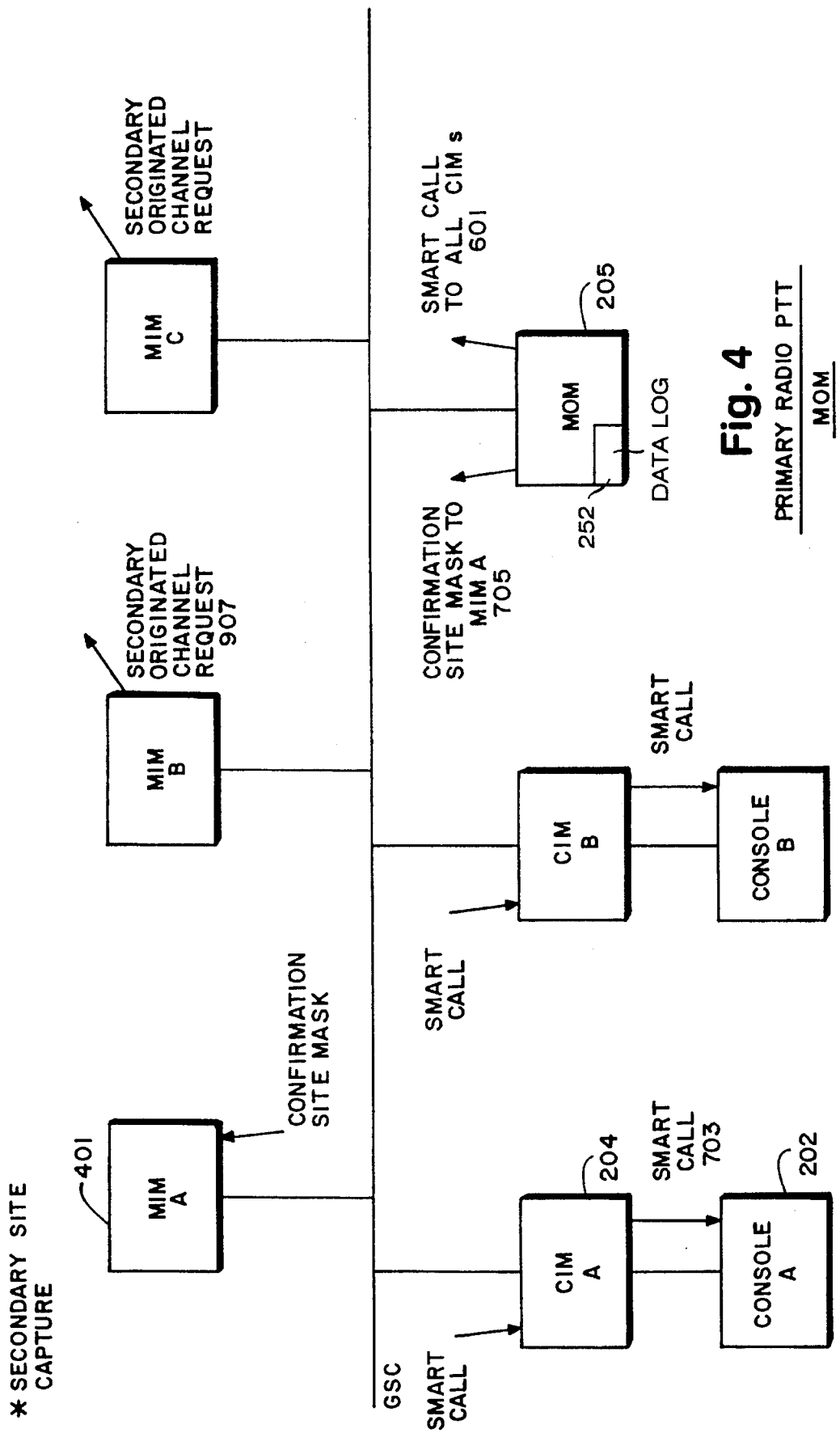

PRIMARY RADIO PTT
MOM

SECONDARY SITE CONFIRMATION
PRIMARY SITE

RF TRUNKING MULTISITE SWITCH CONFIGURATION AND DIAGNOSTICS INTERFACE

RELATED APPLICATIONS

This is a continuation of application Ser. No. 07/787,875, filed Nov. 5, 1991, now abandoned, which is a continuation-in-part of application Ser. No. 07/573,977 abandoned, entitled "Distributed Multisite Coordination System" filed on 28 Aug. 1990 in the name of James L. Teel, Jr., and which is incorporated by reference.

This application is related to the following commonly assigned U.S. patent applications.

Application Ser. No. 07/532,164, filed Jun. 5, 1990, entitled "Fail-Soft Architecture for Public Trunking System", now U.S. Pat. No. 5,175,866, issued Dec. 29, 1992.

Application Ser. No. 07/658,843, filed Feb. 22, 1991, entitled "Dynamic Address Allocation Within RF Trunking Multisite Switch", now U.S. Pat. No. 5,276,442, issued Jan. 4, 1994.

Application Ser. No. 07/658,640, filed Feb. 22, 1991, entitled "Bus Slot Update/Idle Control In RF Trunking Multisite Switch", now U.S. Pat. No. 5,253,253, issued Oct. 12, 1993.

Application Ser. No. 07/658,798, filed Feb. 22, 1991, entitled "Multisite Switch System Controller Architecture", now U.S. Pat. No. 5,239,538, issued Aug. 24, 1993.

Application Ser. No. 07/658,637, filed Feb. 22, 1991, entitled "Protocol Between Console and RF Trunking System", now U.S. Pat. No. 5,200,954, issued Apr. 6, 1993.

Application Ser. No. 07/658,636, filed Feb. 22, 1991, entitled "Audio Routing Within Trunked Radio Frequency Multisite Switch" U.S. Pat. No. 5,384,776.

Application Ser. No. 07/658,844, filed Feb. 22, 1991, entitled "Distributed Multisite Switch Architecture" U.S. Pat. No. 5,392,278.

The disclosure of each of these related applications is incorporated by reference.

FIELD OF THE INVENTION

This invention relates to radio frequency (RF) signal transmission systems. In particular, the invention relates to an audio and data routing switch for a distributed network of trunked radio transmission systems. This switch has an interface for communicating configuration and diagnostics information for the entire system from a central computer or a system manager.

BACKGROUND AND SUMMARY OF THE INVENTION

Multiple-site (Multisite) RF transmission systems broadcast signals from more than one base station. This allows radio communications to cover a larger area than is possible with a single base station.

The present invention relates to a network of several single site trunked radio systems. An example of a single site transceiver system is disclosed in commonly-assigned U.S. Pat. No. 4,905,302, entitled "Trunked Radio Repeater System" and U.S. Pat. No. 4,903,321 entitled "Radio Trunking Fault Detection System" which are incorporated by reference. Digital trunked radio transceivers capable of handling communications between numerous mobile units and dispatcher consoles in a single area are known.

It is generally impractical for a single VHF/UHF RF repeater transmitting site to effectively serve a large geographical area. The broadcast area of a single site is limited by several factors. The effective radiated power of the antenna is subject to legal and practical limits. In addition, natural and man-made topographical features, such as mountains and buildings, block signals from certain locations.

Multiple transmitting sites are necessary to provide RF communications to all locations within a given locality. Multiple transmitters may be needed to cover a rural community covering many square miles or a city having many buildings. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch networks the radio systems together to establish audio slots connecting one site controller to another. Thus, a caller in one area can communicate with someone in another area.

One known method to link several individual trunked systems is simulcasting. Simulcast systems broadcast the same signal at the same time from several base stations. A receiver in area A2 can listen to a signal that originated in area A1 because all of the site transceivers, including at S2, broadcast the same signal. There are difficulties when signals are broadcast simultaneously from several overlapping transceivers as is more fully described in the commonly-assigned application Ser. No. 07/260,184 entitled "Public Service Trunking Simulcast System" filed Oct. 20, 1988, now U.S. Pat. No. 5,172,396, issued Dec. 15, 1992. In the areas where the signals overlap, signals from different transmitters interfere to create null regions and signals combine to generate undesirable audible signals which are received by the callee. Despite these problems, successful simulcast systems are operational and have overcome the problems inherent with simultaneous signal transmission. However, the present invention does not employ simulcast.

The present invention is directed to a multisite RF trunked repeater system. As with simulcast, multisite allows a caller in one area (e.g. A1) to communicate with a callee in another area (e.g. A2). Unlike simulcast, multicast does not broadcast signals simultaneously from several transmitters on a single channel into all areas. Multisite broadcasts signals only into those areas where the intended callee(s) is located. Moreover, in a multisite network, each site assigns a specific channel to a call independently of the channel assignments made by other sites. Thus, a single call may be broadcast from several site transmitters each operating on a different frequency.

In multisite, the site controller (S1) receives a call from a mobile radio in A1 requesting a channel to communicate with a specific callee. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

In addition, the site controller sends the channel assignment to the multisite network switch. The switch assigns an internal audio slot to the call. The switch also sends a channel request to all other site controllers or to only those site controllers having a designated callee within their area. Upon receiving a channel request, these secondary site controllers assign a channel to the call. Again, each secondary channel is operative only in the area covered by the secondary site controller. The secondary site controller(s) also sends the channel assignment back up to the multisite switch. The caller can then communicate with a unit or group in an other area via the multisite switch. The call is initially transmitted to the primary site controller, routed through the assigned audio slot in the switch and retransmitted by the secondary sites on various assigned channels in those other areas.

In addition to providing communications between mobile radio units in different areas, the multisite network switch provides communications between dispatchers and mobile radio units. The dispatcher consoles are connected to the network switch in the same manner as are the site controllers. A dispatcher console can issue a channel call request through the network switch to a site controller in another area to call a mobile unit or to another dispatcher console to call a dispatcher in another area.

In addition to all of the features that the mobile units have, each dispatcher console has the ability to participate in any call in its area or to its assigned groups. Thus, when a call comes through the network switch from another area to a mobile radio, the network switch informs the dispatcher console of the call in addition to notifying the site controller. The dispatcher can listen in or participate in the call to the mobile radio.

The network switch is also capable of handling calls to groups of mobile units and/or dispatcher consoles. The wide area switch manages group calls and monitors the network to ensure that the site controllers for all of the callees in the group assign a channel to the group call. If a channel is not assigned, the wide area switch advises the caller that the wide area call cannot be formed as requested. The caller then has the option of re-keying the call so as to reach those areas having assigned channels.

The multisite switch maintains site and track masks in its databases to identify and locate each unit and group in the entire radio system covered by the multisite switch. A site mask is maintained for each radio unit in the system and each group of units. A track mask is also maintained for each user and group in the system. The site masks are static and are stored in a system manager for the system. The site mask must be uploaded from the system manager to appropriate nodes in the switch when a call is initially placed. The track mask is dynamic and is continuously updated by log-ins and call activity from the units in the various sites.

In the preferred embodiment, each mask is a 16-bit field. Each bit corresponds to a particular site. A one (1) bit signifies that this site should be involved in calls to the group or individual associated with the mask. A group can have multiple bits set in its site and track masks because there may be group members spread over several sites. An individual may have multiple bits set in his site mask but only one bit set in his track mask. An individual can be in only one site at a time. Accordingly, the track mask should only have one bit set at a time. By use of these masks, the multisite switch can determine which sites should participate in a call and which sites have certain units and group members. Using this information, the switch can route audio to the appropriate sites.

The entire RF system can be configured and diagnosed through the multisite switch. There is a Monitor Module (MOM) interface into the multisite switch for a system manager computer that holds various databases for the system and for a MOM computer, e.g., personal computer (PC) that can be used for configuration and diagnostic purposes. This MOM interface into the switch is similar to the other node interfaces that connect the switch to consoles and individual sites. A system operator using the MOM can configure the trunked channels at any of the individual base stations connected to the switch. The user can also perform many other configuration and diagnostic functions throughout the system from the MOM PC.

The multisite switch has a distributed architecture. The logical functions of the switch are shared by various microprocessor operated nodes distributed throughout the switch. The nodes share the computational workload of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

Each node of a multisite network switch is supported by a switch controller card operated by microprocessors. All of the cards have substantially the same hardware and are interchangeable. The MIM and CIM cards have identical hardware. There is one card for each site controller and each dispatcher console coupled to the switch. Each card acts as a gateway into the network for its site controller or dispatcher console.

The multisite switch does not completely fail if one card breaks down. Wide area communications, i.e. calls between site areas, continue despite the failure of a node. If a card fails, then the gateway to the network is closed only for its site controller or dispatcher console. Failure of a node prevents wide area communications only with respect to the site or console connected to the failed node. Mobile units in the area serviced by the failed card will not be able to call a unit in another area or receive calls from another area.

Local communications within an area are not disabled by the failure in the multisite switch. A site controller is not disabled by a failure of its associated node in the multisite switch. In particular, the failure of a MIM does not disable the site controller to which the MIM is connected. The site controller continues to operate and local communications within the area are unaffected by a failure in the multisite switch.

The ability to continue wide area calls after a node in the switch has failed provides several advantages to a distributed architecture switch over a central architecture switch. In a central architecture, a central processing unit (CPU) governs the operation of the switch. If this CPU fails, then the entire switch fails. Wide area communications are completely shut down by the failure of a multisite switch having a central architecture. As already stated, wide area communications are not completely shut down by a failure in a switch having a distributed architecture.

Distributed network multisite systems have a much faster data transfer rate than comparable central architecture multisite systems. Central computers process information serially. All communications passing through the switch must be serially processed by the central computer. The central computer slows communications because of its serial operation. Distributed network systems achieve parallel processing by sharing the computational task between several processors. Distributed networks are generally significantly faster than central computers.

Distributed network multisite systems are generally less expensive than multisite systems having a central computer. The hardware needed for a distributed network is a series of microprocessor controlled cards that handle communications between the multisite switch and the site central controllers, dispatcher consoles and various other users of the network. The cost of a series of cards is typically much less than that of a central computer. Moreover, a distributed network switch can be expanded simply by adding cards. To expand the capacity of a central computer requires purchasing a larger central computer.

BRIEF DESCRIPTION OF THE DRAWINGS

FIG. 4 is a message chart for the MOM when receiving a primary radio PTT;

DETAILED DESCRIPTION OF THE DRAWINGS

Figure 1:
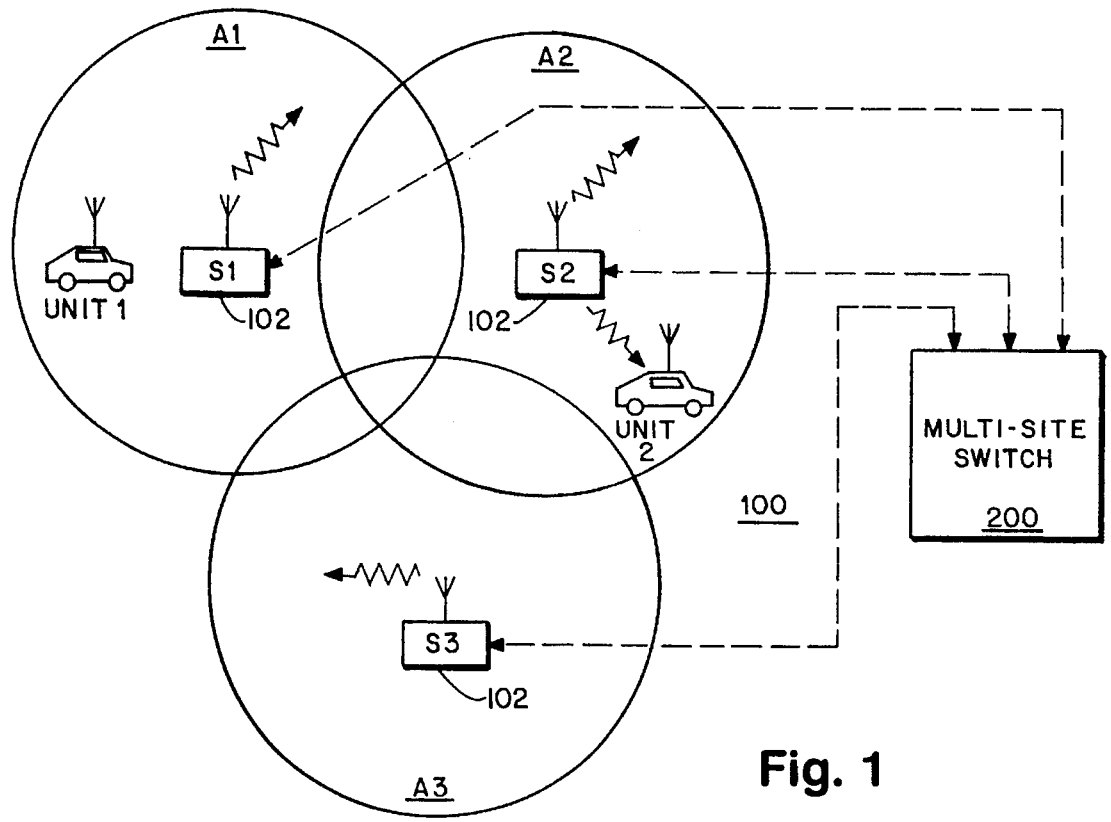
FIG. 1 is an illustration of three site radio system networked together by a multisite switch.

An exemplary trunked radio repeater system in accordance with the invention is generally depicted in FIG. 1. Individual remote units communicate with each other through shared radio repeaters that are part of the trunked repeater system 100. The system is composed of several sites 102. Each site includes a site transceiver that broadcasts signals over a certain area and a site controller. For example, site S1 broadcasts over area A1. The remote units can communicate with units within their own area or with units in other areas. The remote units also communicate with the dispatcher console for each site.

Each site is controlled by a site controller. The site controller controls much of the data and audio traffic in its area. The site controller is described in more detail in the application and patents previously mentioned. For purposes here, the site controller communicates with the multisite switch 200. The multisite switch handles communications between sites.

I. General Description of Multisite Switch

Figure 2:
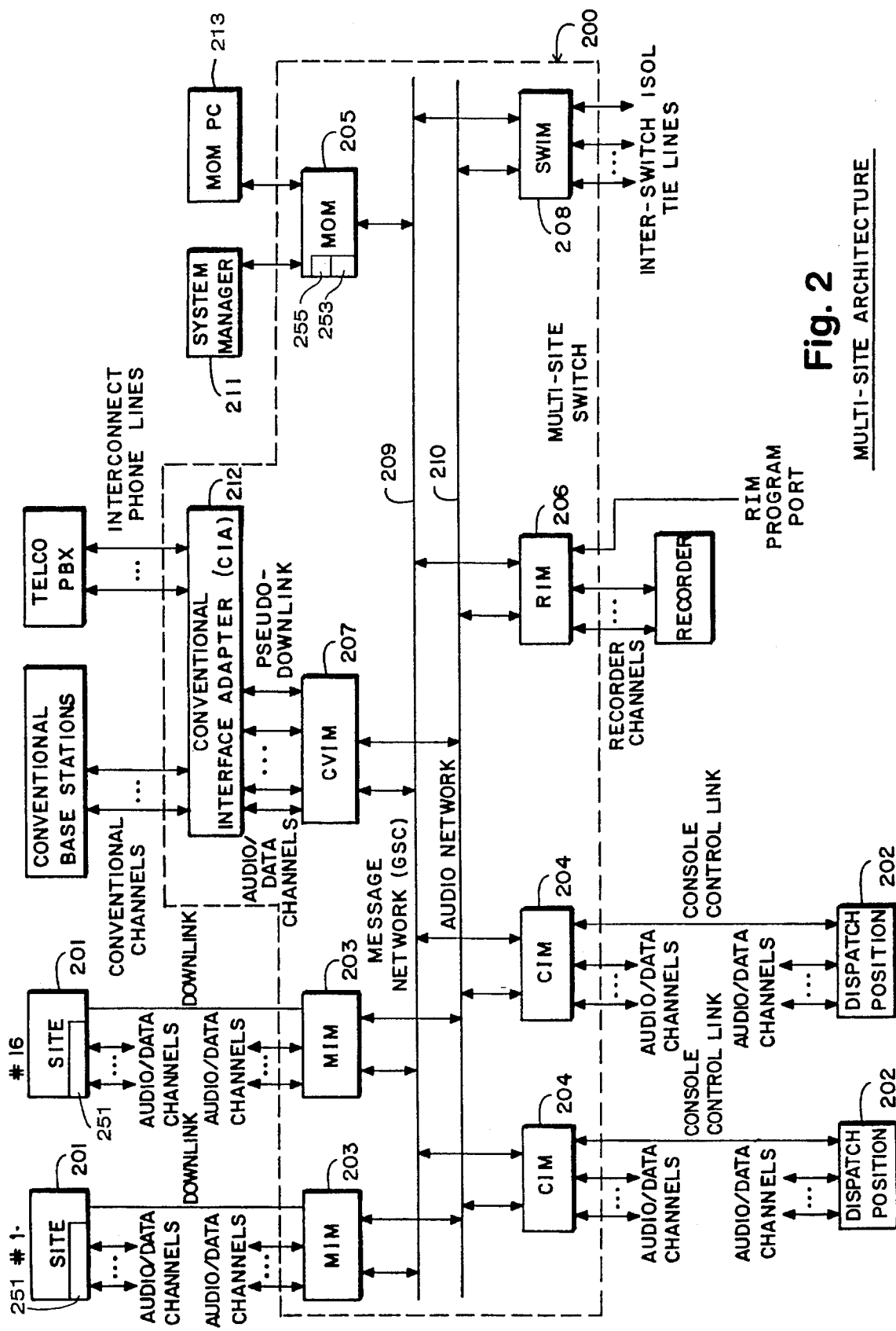
FIG. 2 is a schematic of the architecture for a distributed network multisite.

Communications between sites are conducted through the multisite switch 200 shown in FIG. 2. The multisite switch communicates with the site controllers 201 in each site and the dispatcher consoles 202. There are both data and audio communication lines between the multisite switch and each site controller and dispatcher console.

The primary responsibility of the multisite switch is to establish and remove audio connections among the audio channels connected to it. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, a Recorder Interface Module (RIM) 206, Conventional Interface Module (CVIM) 207 and Switch Interconnect Module (SWIM) 208.

The MOM 205 is the interface for the system manager 211 and the MOM PC (personal computer) 213. The system manager updates the databases in all of the nodes. The MOM maintains certain centralized databases including databases for smart calls and confirmed calls. Smart calls relate to the operation of the dispatcher console. A call is "smart" if the call has been selected, i.e., being listened to by the dispatcher via a select speaker in the console. If the call is not selected by at least one console, then a flashing indicator light appears on certain consoles. Thus, several dispatchers can readily see which calls are not being monitored by at least one dispatcher.

A confirmed call is one for which the audio channel and slot assignments must be confirmed before the caller begins talking. The system manager 211 sets which calls are to be confirmed and provides this information to the site controllers. The channel assignment for the originating call from the primary site controller instructs the multisite switch that the call is to be confirmed. The MOM receives a message that a confirmed call is requested and then tells the primary MIM which secondary MIMs must confirm the call by sending a site mask to the primary MIM. The site mask held in the MOM identifies each secondary MIM to participate in the confirmed call.

The RIM 206 interfaces audio recorders to the switch. Recorders are assigned to record calls for various groups or units. The CVIM 207 functions much the same as a MIM but is coupled to telephone lines and standard base stations whereas the MIMs are coupled to site controllers for digital trunked radio systems. The conventional interface adapter (CIA) 212 is merely an interface between the CVIM and the telephone lines and base stations. Similarly, the SWIM interfaces the switch with telephone lines.

Each node in the multisite switch is supported by a microprocessor controlled communications card. All of the cards for the MIMs, CIMs, CVIM, MOM, RIM and SWIM have the same hardware and are interchangeable. The cards have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and a digital audio bus 210. The message bus 209 is shown in FIG. 2 as a message network using an Intel 80C152 Global Ser. Channel (GSC) microprocessor. The message network is a high speed data bus that resides in the GSC microprocessor.

The audio bus 210, in the present embodiment, comprises 32 time division multiplexed buses. Each bus contains 32 slots that each carry a single audio channel. A maximum of 1024 audio slots may be routed through the switch (32 buses×32 slots). The audio slots are assigned by he MOM to specific nodes, e.g., MIMs and CIMs, when the switch is enabled.

As part of the switch start up procedure, the nodes connect their assigned bus/slots to the node's external channel inputs. For example, a MIM will couple each channel from the site controller to a separate audio bus/slot. Once the bus/slot is linked to the channel, the bus/slot receives the output from the channel through the host node. Of course, the channel has no intelligible signal until it is assigned to a call by the site controller. Although a bus/slot is linked to a site channel for purposes of transmission, no other node listens to that bus/slot until the host node sends a slot assignment message throughout the switch notifying the other nodes that a call has been assigned to that bus/slot.

Figure 3:
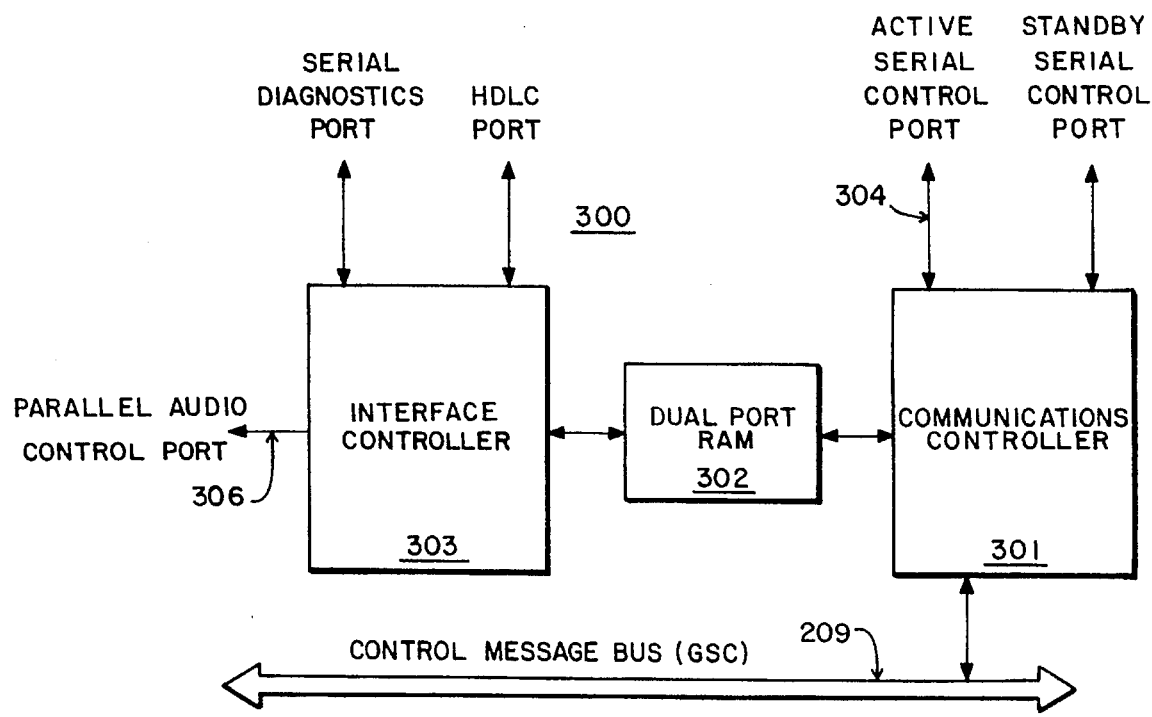
FIG. 3 is a block diagram of the switch controller card, e.g., a MOM.

FIG. 3 shows a block diagram of one of the cards 300. This diagram is applicable to all of the nodes of the switch except for the conventional interface adapter (CIA). Thus, the hardware for the MIM, CVIM, MOM, SMIM, RIM and CIM is a switch controller card. Each card includes a communications controller 301, a dual port random-access-memory (RAM) chip (302) and an interface processor 303.

The communications controller 301 is a message router. It routes messages between the control message bus 209, the serial port leading outside of the switch 304, the message bus and the interface processor 303 through the dual port RAM 302. In the present embodiment, the communications controller is an Intel 80C152 microprocessor. The communications controller is coupled to the message bus 209. This controller places messages onto the bus and receives messages from the message bus. Messages received from the site controller over the serial port are translated into a format usable by the multisite switch. The communications controller also translates switch messages into a format that the site controller understands.

The interface processor 303 performs substantially all of the logical functions for the card. The interface processor is the intelligence for the card. The interface processor, in this embodiment, is an Intel 80C186 microprocessor. The interface processor acts as a switch for the audio network and assigns slots to active audio channels through the parallel audio control port 306.

Each call through the switch is patched to a slot on the audio bus. When the call is terminated, the call is terminated and the slot is made available for assignment to another call. The interface processor for each MIM assigns slots, connects audio slots to the site controller or dispatcher console to establish a communications link, and terminates calls. Since all MIMs and CIMs perform these functions, they must continually inform each other and the other nodes of their slot assignments. Accordingly, the MIMs and CIMs send messages regarding slot assignments, slot updates and slot idles over the message network 209 to other nodes.

The communications controller 301 for each node initially processes all of the messages on the message network. Slot assignments are forwarded to the interface processor through the dual port RAM. Redundant slot update/slot idle messages are not forwarded to the interface processor by its communications controller. Messages regarding slot updates or idle slot control are processed by the communications controller by referring to a bit map located in the RAM storage 302. Update messages are sent periodically by a primary MIM to confirm to the other nodes the active status of a slot. When a primary MIM terminates a call it sends a slot idle message to the other nodes. The primary MIM also periodically sends update idle messages until the slot is reassigned to another call.

II. Description of MOM Controller

The MOM Controller is the same physical hardware module as a controller for the CIM or MIM. To implement the MOM personality, the dip switches of the module are set uniquely for the MOM. These dip switch settings cause the MOM code in the module's ROM to execute. The MOM Controller has two external serial interfaces. The first interface is with the MOM PC that provides real-time updates on configuration and status data, along with various other data. The second interface is with the system manager that allows the MOM to obtain system wide group, unit, and site data. Data from the system manager is broadcast by the MOM to all nodes within the multisite switch and to the MOM PC.

The active serial control port 304 (and standby serial control port) is embedded within the communications controller and is a standard RS-232 port coupled to a UART standard serial interface. The active serial control port coupled the communications controller to the MOM PC, and system manager 211. In the preferred embodiment, land lines connect these units to the multisite switch. It is within the scope of this invention to use RF, microwave, optical or other means for conveying signals to the switch.

In the preferred embodiment, there is a trunking card or downlink trucking card associated with the MOM PC and system manager that receives the serial communications from the serial port to the multisite switch. Trunking cards and downlink trunking cards are fully disclosed in U.S. Pat. No. 5,175,866, entitled "Fail-Soft Architecture for Public Trunking System" that is cited above. Trunking cards and downlink trunking cards are a common interface unit used in the assignee's trunked radio systems.

In addition to the two external serial interfaces, the MOM is connected to the Global Serial Channel (GSC) message bus that connects all nodes within the multisite switch. The GSC message bus allows the MOM to communicate with the switch nodes. The MOM is the only device within the switch that accesses the vector reset hardware that is contained in the controllers in each node. This vector reset is used to control the redundancy aspects of the switch and is described in greater detail in U.S. Pat. No. 5,239,538, which is incorporated by reference.

The MOM has several functions in the multisite switch including:

setting audio channel levels into and out of the site controller, controlling patch and simulselect calls, setting the system time for the switch, logging messages on the switch message bus, polling the switch for error and other messages, setting node configurations, handling node redundancy (vector reset), monitoring node status, tracking smart calls (calls being broadcast over a select speaker to a dispatcher), conveying system manager data to switch nodes, allocating TDM audio bus slots to the nodes, monitoring the load on the message bus, conveying console user profiles, baud rate selection.

The MOM can configure the trunked RF channels at the various sites connected to the multisite switch. Configuring the trunked channels at switch start-up is primarily the responsibility of the MOM PC 213. The MOM PC individually configures each trunked channel at each site coupled to the switch. In configuring a channel, the MOM PC adjusts the transmit and receive audio levels, and the compression threshold. Similarly, the MOM PC can enable/disable the 2175 Hz tone and notch filter 251 for each channel within the RF system. To configure a trunked channel, the MOM PC sends a serial message for each channel configuration command (sets channel audio level) to the MOM controller which broadcasts the command on the GSC message bus where it is received by the proper switch MIM or CVMIM node. The controller for this node sends the command to the audio board in the node handling the channel. The audio board sets the audio level for the channel in accordance with the command. When the audio level is set, the node sends a success message to the MOM and, in turn, the MOM PC. The MOM receives the message from the GSC message bus and outputs it serially to the MOM PC to update the PC data base of channel configurations.

The MOM Controller is the central control for patches and simulselect calls made within the communications network covered by the switch. A patch call is one that the calling dispatcher forms by joining two or more groups in one temporary group. A simulselect call is one that is broadcast by a dispatcher to several groups or individuals. All patch/simulselect header, collection, activate, and deactivate messages sent on the GSC bus are received by the MOM controller. These messages are broadcast to all MIM's in the switch and databased in the MOM controller, unless there is a database error message associated with the patch/simulselect message. As the secondary sites respond to the patch activate messages, the MOM sets the site mask bits corresponding to each site responding to the messages. Upon receiving the first response from a MIM or CVMIM, the MOM outputs a patch/simulselect header message, followed by collection messages for all groups involved in the patch/simulselect call to all consoles. This allows the consoles to database the patch/simulselect call. The same process is done in reverse for patch/simulselect inactive messages. If any error is encountered, the patch/simulselect call is torn down by the nodes participating in the call.

The system time for the multisite switch is maintained by the MOM controller. The system time is initially set by the MOM PC at start-up and is periodically updated by the MOM PC for verification. The MOM controller broadcasts the system time onto the GSC message bus to maintain time synchronization with all the nodes in the switch. The system time is also used by the consoles so that they display the same real time to the dispatchers. A WWVB receiver (a receiver for a standard time signal broadcast) may be interfaced to the MOM PC to provide synchronized time to WWVB standard throughout the system.

All messages on the GSC message bus are logged into a data log buffer 253 by the MOM controller. The MOM controller is setup in a "receive all" mode to receive all messages transmitted on the bus. Each message is time stamped 255 (accurate to 480 msec.) before being placed in the data log buffer. Periodically, the messages held in the data log buffer are moved (dumped) to the MOM PC for processing and evaluation. The MOM controller monitors the MOM data log buffer 253 and dumps all the logged messages when the buffer is more than 60% full.

The MOM controller is constantly polling the system in search for errors and various configuration data. When the MOM PC user is not requesting status data, the MOM controller defaults to the node configuration mode. In this mode, the MOM requests current configuration data from each node within the multisite switch. This current configuration data identifies the device type connected to that node (e.g., site controller, console, conventional base station), device assignment, and whether errors have been logged in on the switch for that device. The MOM uses this configuration data in a variety of ways. If a new multisite node responds to a MOM poll and this node is not logged into the MOM, the MOM outputs an ADD__NODE message to the MOM PC for configuration display purposes. The configuration of each site and console can be displayed by the MOM PC. Similarly, if a node fails to respond to a MOM poll message, the MOM outputs a DEL__NODE message to the MOM PC to delete the node from the MOM PC configuration screen. If a node response indicates an error, the MOM notifies the MOM PC that an error condition exists. The MOM PC will blink error symbols for that node on its configuration screen. The MOM also uses its polling algorithm for node redundancy purposes and to invoke the reset vector in each node controller.

The MOM avoids node redundancy problems. If two nodes try to become the same device (e.g., MIM 1), the MOM allows the first node to be the primary node and the second to become the secondary node. This is performed using the vector reset hardware of the switch. If the primary node fails, (i.e. stops responding to polls, resets, and other commands), the MOM immediately resets the current primary node and commands the current secondary node to become the primary node. The MOM PC immediately notifies its user of this failure condition.

The MOM Controller will monitor the status of any switch node on command from the MOM PC. A user of the MOM PC can observe status data on a selected node by commanding the MOM controller to poll the node. When the node responds to the poll, the status data is transmitted to the MOM PC via the MOM. This gives real-time updates to the MOM PC user of status or error conditions on that node.

The MOM controller continues to perform its node polling algorithm when in the node status mode. The MOM always regularly polls each switch node to detect any redundancy between nodes. However, the polling runs at a slightly slower rate to prevent overloading the GSC when the MOM is in its node status mode than when the MOM is in node configuration mode.

A smart call is a console feature that indicates whether an incoming call is being listened to by a dispatcher in the system (i.e., a call is "smart" if at least one select speaker in a dispatch console is broadcasting the call). All consoles assume a call is not smart unless notified to the contrary by the MOM. The MOM controller keeps track of all selected modules, (units, groups, conventional channels, etc.) within the system and tracks which of these are selected by at least one select speaker. If a call is received on a group/unit that is assigned to any select speaker, the MOM outputs the smart call message to all CIMs in the system. The CIMs notify the dispatch consoles to display signals indicating that the call is being broadcast on any select speaker.

System manager data includes the unit, group and site data needed throughout the switch for valid operation. This data is used by the MOM and may be obtained through the MOM PC. The MOM controller broadcasts this system manager data to all nodes within the switch over the GSC message bus, and to the MOM PC for databasing. It is contemplated that the MOM PC will be able to output system manager data from its database (from a previous download) to the switch when the system manager is down. Thus, the switch can operate while the system manager is inoperative.

Each CIM, MIM and CVMIM node is allocated certain slots on the TDM audio bus at start up. The MOM controller receives the slot count for each node from the MOM PC which identifies the number of audio slots on the TDM buses to be allocated to each node. The MOM controller uses these slot counts to distribute and allocate the TDM slots to most efficiently use the TDM bus slots. In addition, the slots assigned to each node are divided between different busses to ensure that the failure of a bus does not eliminate an entire site or console from interacting with the network through the multisite switch.

An example of TDM bus slot allocation is as follows:
  Assume four TDM buses each with 32 slots are available
    within the switch:

Receive Slot Configuration Message from MOM PC allocating seven slots to a MIM (site interface).

| MOM Controller Allocates: | | |
| --- | --- | --- |
| Channel 1: | Bus 1 | Slot 1 |
| Channel 2: | Bus 2 | Slot 1 |
| Channel 3: | Bus 3 | Slot 1 |
| Channel 4: | Bus 4 | Slot 1 |
| Channel 5: | Bus 1 | Slot 2 |
| Channel 6: | Bus 2 | Slot 2 |
| Channel 7: | Bus 3 | Slot 2 |

The MOM, when operating in "receive all" mode, continually calculates the load on the GSC message bus by monitoring the message traffic on the bus. The calculated load on the message bus is sent to the MOM PC which displays the load to its user. If the load on the message bus is above a certain threshold, then the MOM reduces the frequency of polling to reduce the message traffic. Similarly, when the message bus is busy, the frequency at which nodes broadcast slot assignment and slot idles messages is decreased to reduce the traffic on the message bus. A detailed explanation of slot assignment/idle messaging is provided in U.S. Pat. No. 5,253,253 that is incorporated herein by reference.

The MOM PC has console dispatcher profiles that are used to tailor each console to the needs of its dispatcher and MOM. These profiles are set up and stored at the MOM PC. The MOM PC user configures the dispatcher profiles for each console. Upon request of the MOM PC operator, these profiles are transmitted serially to the MOM which broadcasts the profile messages over the GSC message bus to the appropriate CIM which sends them on to the console. The console stores the profile in nonvolatile RAM. The CIM/console responds to a profile message and the MOM sends the response on to the MOM PC.

The MOM is an intermediate interface for all MOM PC conventional messages. Conventional commands are processed by the CVMIM and CIA for a conventional base station connected to the multisite switch. The interface of a conventional base station with the digitally trunked multisite switch is described in application Ser. No. 07/709,987, entitled "Conventional Base Station Interface Architecture For RF Trunking Multisite Switch" now U.S. Pat. No. 5,241,537, issued Aug. 31, 1993 which is incorporated herein by reference. Upon receiving a conventional message from the MOM PC, the MOM controller broadcasts the message to the CVMIMs in the switch. Likewise, when the CVMIMs respond to the MOM, the responses are passed on to the MOM PC. In this way, the MOM PC provides to the CVMIM and CIA conventional programming and configuration.

The MOM PC user controls the interface between the system manager and MOM by setting an appropriate baud rate over the serial link. The MOM PC user can change this by reconfiguring the serial interface using the MOM configuration screen of the MOM PC. The MOM controller adjusts the serial interface as directed by the MOM PC. The baud rate is stored in NOVRAM on the MOM controller so that the MOM PC user does not need to reconfigure this serial interface each time the MOM is reset or turned on. The MOM PC baud rate with the MOM is controlled by the dip switch setting on the MOM controller. If he device assignment portion of the dip switch is set to a one, the baud rate on this interface with be 9600 baud. Otherwise, the baud rate will be 19.2k baud. The MOM PC user may alter this rate on its end through the MOM configuration screen.

III. Exemplary Operations of MOM and Multisite Switch

Figure 5:
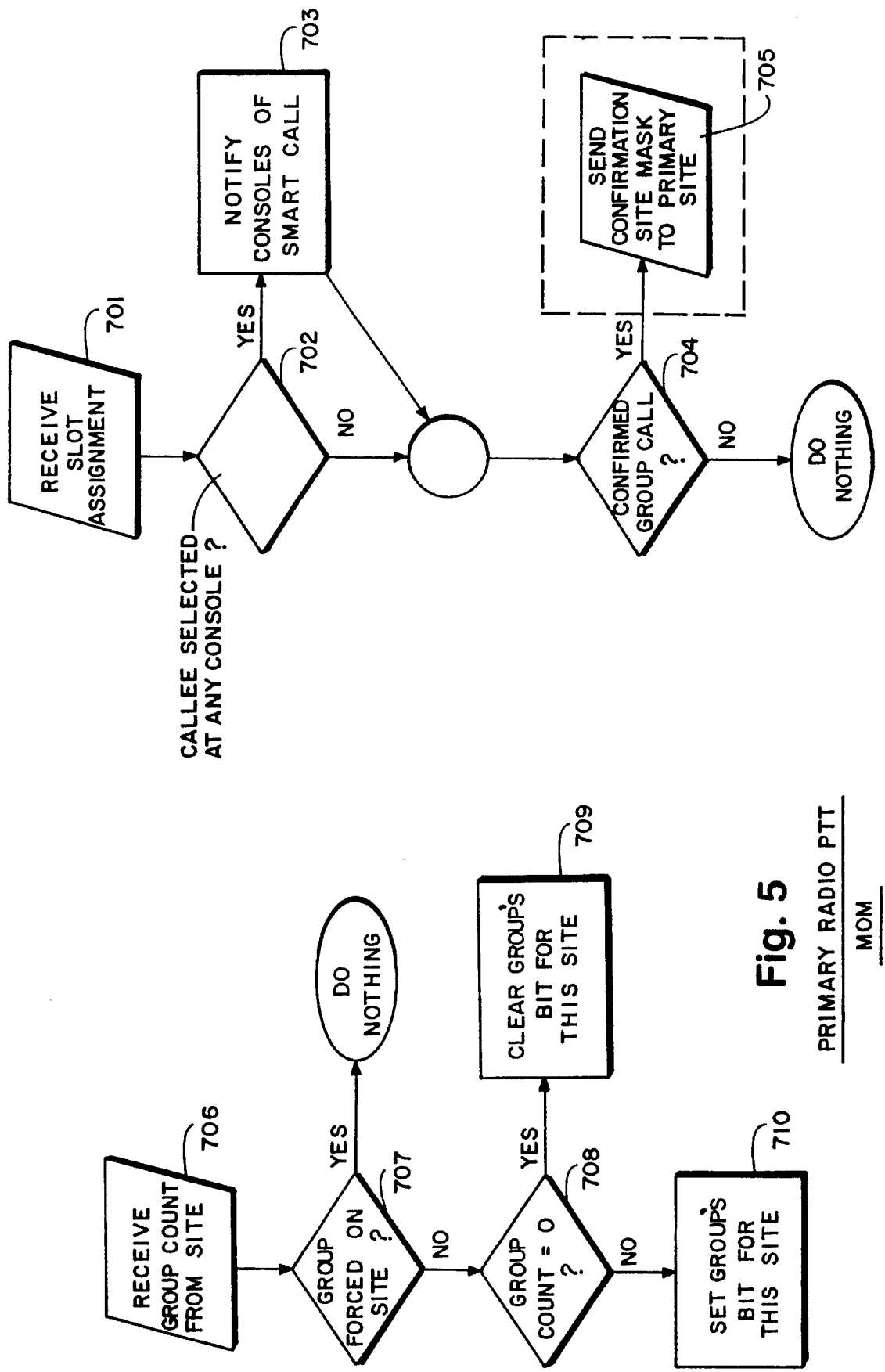
FIG. 5 is a flow chart for the MOM when receiving a primary radio PTT.

As shown in FIGS. 4 and 5, the MOM 205 sets up group calls and informs CIMs of smart calls. The MOM tracks which calls have been "selected" by a dispatcher console and, thus, are being broadcast over the console's select speaker. In step #701, the MOM receives each slot assignment. If a call is "selected," then the MOM notifies the CIMs that it is a smart call (601) in steps #702 and #703. If the call is not being broadcast on any select speaker, then a signal, e.g., flashing light, is activated on one or more consoles to notify the dispatchers of the call. In step #704, the MOM checks whether the call is a group confirmed call. If it is, then the MOM sends a confirmation site mask to the primary MIM in step #705. The confirmation site mask identifies each node that is to participate in the call and enables the primary MIM to track receipt of all the confirmation messages from the secondary MIMs.

Upon receipt of a group count from a MIM, step #706, the MOM first checks whether the group is forced on the MIM in step #707. A group count indicates that a mobile group member has entered or left the site corresponding to the MIM. If the group is forced, then each MIM will automatically request a channel for the group call and the MOM does not need to do anything. If the group is not forced, then in step #708 the MOM checks if the group count is zero and, if so, clears the the group bit for that site in step #709. If the count is zero, then there are no units from the group in the area corresponding to the MIM and the MOM clears the group's bit for that MIM in the confirmation site mask stored in the MOM. If the group count is not equal to zero, then the group bit is set for that MIM in step #710. The MOM maintains this group count database for use with confirmed calls.

Figure 6:
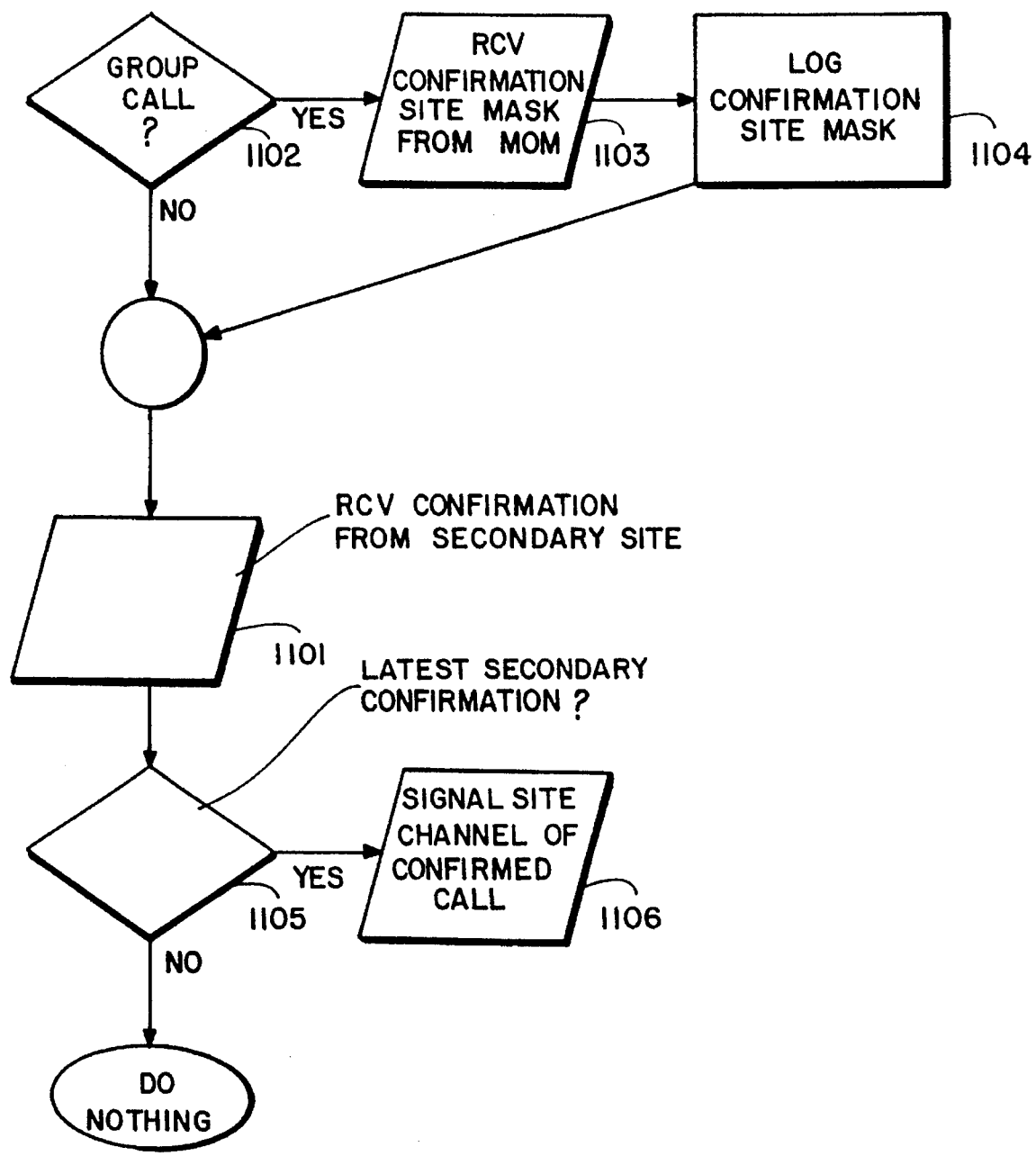
FIG. 6 is a flow chart that shows the processing steps for confirmation of calls.

As shown in FIG. 6, the primary MIM receives confirmation messages from the secondary MIMs for calls designated as confirmed calls. Before receiving these confirmation messages, the primary MIM determines whether the call is to a group or to an individual unit in step #1102. Group calls require the primary site to receive a confirmation site mask from the MOM in step #1103. The primary site stores the site mask in memory in step #1104, and waits for confirmation messages from the secondary MIMs. Upon receiving each secondary MIM's confirmation message, the primary MIM checks whether the message is the last one to be received by using the site mask in step #1105. For cells to an individual unit, there will be only one confirmation message to be received. For group calls, the number of confirmation messages to be received is the number of secondary sites involved in the call. Upon receipt of the last confirmation message, the primary MIM transmits to the caller through the site controller that the call has been confirmed by all callees in step #1106.

The few exemplary procedures involving the MOM described above show how the MOM interacts with the multisite switch. A complete explanation of the MOM and its interfaces is contained below in the description of the messages acted upon by the MOM.

IV. Messsaging between MOM, MOM PC, System Manager.

The serial interface between the MOM PC and the MOM controller card has a default mode of a 19.2k baud rate with 8 bits and no parity. The MOM PC user has the capability of lowering the baud rate to 9600 baud.

Each message passing through the interface between the MOM PC and the MOM controller is preceded by a sync byte (AA) for synchronization in case of protocol problems. Following the sync byte is a byte designation of the number of bytes in the message. After this message size designation is a message identifier (id) that is followed by the message itself. The last byte of the message is the checksum. The checksum is computed by adding all the bytes of the message together, beginning with the number-of-bytes byte. If the addition causes an overflow the overflow is added back into the checksum. Table A shows this message format.

TABLE A

```
Example:   AA   03   08   EC   F7
            |    |    |    |    |— Checksum (03 + 08 + EC)
            |    |    |    |—— Status Data Request for
            |    |    |         node EC
            |    |    |———— Message ID - Status Data
            |    |              Request
            |    |—————— # bytes following
            |———————— Sync Byte
```

The exemplary message definitions describe below define the communication between the MOM PC and the MOM controller. Some of these messages are initiated from other switch nodes such as CIM's and MIM's and reported to the MOM PC, while other messages are initiated by the MOM PC and directed to CIM's, MIM's and other nodes.

IV(i). MOM Reset

The MOM reset message is transmitted from the MOM to the MOM PC when the MOM controller has reset. This message causes the MOM PC to clear its database forcing the MOM controller to report its most recent data.

| MOM controller sends: MOM_RESET (0) | | |
|---|---|---|
| # Bytes | Field | Function |
| (1) | message_id | MOM_RESET |

IV(ii). Add Node

The add node message is transmitted from the MOM controller when a new node has been added to the system. At startup, all existing nodes are added by this command. node can be added at any time without re-starting the entire switch.

| MOM controller sends: ADD_NODE (1) | | |
|---|---|---|
| # Bytes | Field | Function |
| (1) | message_id | ADD_NODE |
| (1) | node_type | node type (CIM, MIM, . . . ) |
| (1) | node_id | GSC node id |
| (1) | device_id | device id (CIM1, CIM2, . . . ) |

IV(iii). Delete Node

The delete node message is transmitted from the MOM controller when a node has stopped responding to polls. The MOM controller assumes that the node has gone down.

| MOM controller sends: DEL_NODE (2) | | |
|---|---|---|
| # Bytes | Field | Function |
| (1) | message_id | DEL_NODE |
| (1) | node_type | node type (CIM, MIM, . . . ) |
| (1) | node_id | GSC node id |
| (1) | device_id | device id (CIM1, CIM2, . . . ) |

IV(iv). Add Multiple Nodes

The add multiple nodes message is transmitted periodically by the MOM controller for verification of MOM controller and MOM PC configuration databases. This message informs the MOM PC of all the current active devices (CIM, MIM and CVMIM), operating in the multisite switch.

| MOM controller sends: ADD_MULT_NODES (3) | | |
|---|---|---|
| # Bytes | Field | Function |
| (1) | message_id | ADD_MULT_NODES |
| (1) | node_type | node type (CIM / MIM) |
| (1) | start | device assignment to start |
| (16) | node | with 16 GSC node id's beginning with start |

IV(v). Request MOM PC Active

The request MOM PC active message is issued from the MOM controller to determine if the MOM PC is currently active. If the MOM PC is active it will respond with a MOM PC active message.

| MOM controller sends: REQ_MOM_ACT (4) | | |
|---|---|---|
| # Bytes | Field | Function |
| (1) | message_id | REQ MOM_ACT |

| MOM PC responds with: MOM_ACT (5) | | |
|---|---|---|
| # Bytes | Field | Function |
| (1) | message_id | MOM_ACT |

IV(vi). MOM PC Inactive

The MOM PC inactive message is transmitted to the MOM controller from the MOM PC when the MOM PC's user logs off. This allows the MOM controller to stop sending certain specific serial messages to the MOM PC,

| MOM PC sends: MOM_INACT (6) | | |
|---|---|---|
| # Bytes | Field | Function |
| (1) | message_id | MOM_INACT |

IV(vii). Configuration Data Request

The configuration data request message is issued to the MOM controller from the MOM PC when the user wants to monitor switch configuration data, such as device types, device node id's, and device assignments. The MOM controller takes this request and begins to poll the devices in foreground (at a faster rate). This also allows the MOM controller to begin to periodically output ADD_MULT_NODES (Add Multiple Nodes) messages to the MOM PC.

| MOM PC sends: CONFIG_REQ (7) | | |
|---|---|---|
| # Bytes | Field | Function |
| (1) | message_id | CONFIG_REQ |
| MOM controller responds with: ADD_MULT_NODES (3) | | |
| # Bytes | Field | Function |
| (1) | message_id | ADD_MULT_NODES |
| (1) | node_type | node type (CIM / MIM) |
| (1) | start | device assignment to start |
| (16) | node | start 16 GSC node id's beginning with start |

IV(viii). Status Data Request

The status data request message is issued to the MOM controller by the MOM PC when the PC MOM user wants to monitor status data of a particular node. The MOM controller responds with status data (buffer overflows, GSC and Tx/Rx errors) for the selected node. The MOM controller also reports GSC loading measurements for the MOM PC to display to the user. If any nodes have stored status errors, they report these errors to the MOM controller, which in turn, reports the errors to the MOM PC. When a node reports status data errors, this causes the MOM PC configuration data screen to blink these nodes in order to alert the user of possible error conditions.

MOM PC sends: STATUS_REQ (8)

| # Bytes | Field | Function |
|---|---|---|
| (1) | message_id | STATUS_REQ |
| (1) | node_id | requesting node id |

MOM controller responds with: STATUS_RES (9)

| # Bytes | Field | Function |
|---|---|---|
| (1) | message_id | STATUS_RES |
| (1) | node_id | status data response node id |
| (1) | node_type | node type (CIM, MIM, MOM) |
| (2) | c152_serial_ovfl | 80C152 serial buffer overflows |
| (2) | c152_gsc_ovfl | 80C152 GSC buffer overflows |
| (2) | c152_to_c186_ovfl | 80C152 → 80C186 buf overflows |
| (2) | c186_serial_ovfl | 80C186 serial buffer overflows |
| (2) | c186_gsc_ovfl | 80C186 GSC buffer overflows |
| (2) | c186_to_C152_ovfl | 80C186 → 80C152 buf overflows |
| (2) | gsc_rx_error | GSC receive error count |
| (2) | gsc_tx_error | GSC transmit error count |

MOM controller responds with: GSC_LOADING (10)

| # Bytes | Field | Function |
|---|---|---|
| (1) | message_id | GSC_LOADING |
| (2) | measurement | GSC loading measurement |

MOM controller responds with: STATUS_ERR (16)

| # Bytes | Field | Function |
|---|---|---|
| (1) | message_id | STATUS_ERR |
| (1) | node_type | node type (CIM, MIM, MOM) |
| (1) | node_id | GSC node id of device |
| (1) | device_id | device id (CIM1, CIM2) |

IV(ix). TDM Bus Slot Allocation Data

The TDM bus slot allocation data set of messages is used to setup and determine the TDM bus slot allocation used throughout the multisite switch. This TDM data is necessary to provide allocated slots for each node to transmit audio internally within the switch.

a. Send TDM Bus Site Slots

The send TDM bus site slots message is transmitted to the MOM controller from the MOM PC after the PC user has allocated the appropriate number of slots needed for each site (MIM and CVMIM). The MOM controller databases this data in non-volatile RAM (NOVRAM) and signals each device of its allocation when it first comes up out of power up/reset.

MOM PC sends: SEND_SITE_SLOTS_MSG_ID (11)

| # Bytes | Field | Function |
|---|---|---|
| (1) | message_id | SEND_SITE_SLOTS_MSG_ID |
| (1) | device_start | starting device number |
| (16) | slot_count | slots allocated per device starting with device start | b. Send TDM Bus Console Slots

The send TDM console slots message is transmitted to the MOM controller from the MOM PC after the PC MOM user has allocated the appropriate number of slots needed for each dispatcher console (CIM). The MOM controller databases this data in NOVRAM and signals each device of its allocation when it first comes up out of power up/reset.

MOM PC sends: SEND_CONSOLE_SLOTS_MSG_ID (12)

| # Bytes | Field | Function |
|---|---|---|
| (1) | message_id | SEND_CONSOLE_SLOTS_MSG_ID |
| (1) | device_start | starting device number |
| (16) | slot_count | slots allocated per device starting with device start | c. Read TDM Bus Slots

The read TDM bus slots message is sent to the MOM controller from the MOM PC when the user wants to know the current TDM bus slot allocation stored at the MOM controller. The MOM controller responds with two messages:

(1) READ_SITE_SLOTS_MSG_ID to report the TDM bus slot allocation for each site (MIM and CVMIM) interface node and (2) READ_CONSOLE_SLOTS_MSG_ID to report the TDM bus slot allocation for each console (CIM).

MOM PC sends: READ_SLOTS_MSG_ID (13)

| # Bytes | Field | Function |
|---|---|---|
| (1) | message_id | READ_SLOTS_MSG_ID |

MOM Controller responds with:
READ_SITE_SLOTS_MSG_ID (11)
READ_CONSOLE_SLOTS_MSG_ID (12)

| # Bytes | Field | Function |
|---|---|---|
| (1) | message_id | READ_SITE_SLOTS_MSG_ID |
| (1) | device_start | starting device number |
| (16) | slot_count | TDM bus slot allocation for each device starting at device_start |

IV(x). Datalog Dump

The datalog dump message is issued to the MOM PC from the MOM controller when the MOM's data log buffer is full. The data in the data log buffer consists of all GSC message bus activity plus node conditions recorded by the MOM controller. The data is stored in a raw format and can be observed via the MOM PC through external functions designed to extract specific messages from the dump. The MOM PC stores this data to its hard disk as it is received.

MOM controller sends: DATALOG_DUMP (14)

| # Bytes | Field | Function |
|---|---|---|
| (1) | message_id | DATALOG_DUMP |
| (18) | dump_data | 18 bytes of data logged data |

At the end of each day, the MOM controller outputs a DATALOG_DAY_COMPLETE message to the MOM PC. This allows the MOM PC to close the data log file for the current day and open a new data log file for the next day.

MOM controller sends: DATALOG_DAY_COMPLETE (18)

| # Bytes | Field | Function |
|---|---|---|
| (1) | message_id | DATALOG_DAY_COMPLETE |

IV(xi). Request System Manager Data

System Manager data may be obtained in one of two ways: (1) the user at the MOM PC may request system manager data through its user interface or (2) when a MIM first comes up out of reset and the MIM does not have the system manager database in its nonvolatile RAM, the system manager data is automatically requested. In addition, system manager group upload request can be initiated from MOM PC through the user interface on request of the PC MOM.

| MOM PC sends: REQ_GROUP_UPLOAD (20) | | |
|---|---|---|
| # Bytes | Field | Function |
| (1) | message_id | REQ_GROUP_UPLOAD |

IV(xii). System Manager Unit Upload Request

The system manager unit upload request is initiated from MOM PC user interface on request of the PC MOM user.

| MOM PC sends: REQ_UNIT_UPLOAD (21) | | |
|---|---|---|
| # Bytes | Field | Function |
| (1) | message_id | REQ_UNIT_UPLOAD |

IV(xiii). System Manager Unit All Data

The MOM controller initiates the system manager unit all data message when it starts receiving data from the system manager. This data is broadcast to all nodes over the GSC message bus and serially to the MOM PC. The MOM PC stores this data to its hard disk.

| MOM controller sends: SM_UNIT_ALL (224) | | |
|---|---|---|
| # Bytes | Field | Function |
| (1) | message_id | SM_UNIT_ALL |
| (2) | unit_id | unit id |
| (4) | forced_site_mask | sites on which unit MUST communicate |
| (1) | bit_mask | wide area/track/console bits |
| (1) | home_site | unit's home site |
| (2) | home_group | unit's home group |
| (8) | unit_name | unit alias |

IV(xiv). System Manager Group All Data

The MOM controller initiates the system manager group all data message when it starts receiving data from the system manager. This data is broadcast to all nodes over the GSC message bus and serially to the MOM PC. The MOM PC stores this data to its hard disk.

| MOM controller sends: SM_GROUP_ALL (225) | | |
|---|---|---|
| # Bytes | Field | Function |
| (1) | message_id | SM_UNIT_ALL |
| (2) | group_id | group id |
| (4) | forced_site_mask | sites on which unit MUST communicate |
| (1) | bit_mask | wide area/track/console bits |
| (1) | group_type | group type |
| (8) | unit_name | unit alias |

IV(xv). Device Personality

The device personality message is initiated from each individual node within the multisite switch and is used to indicate when a node is reset. This message informs the MOM of its issuing node type (e.g., MIM, CIM), device assignment, and associated GSC node id.

The device personality message allows the MOM controller to perform its node redundancy scheme. When a node is reset and a backup node exists, the MOM controller commands the backup node to become the primary node and the previous primary node to become the backup node. This command sequence is performed through the vector reset hardware on the MOM controller. Node redundancy is controlled by other means, but this is one instance of its occurrence.

The MOM PC uses this message to update the "LAST CLEARED" portion of the node status data screen and clears the errors logged on that screen.

| Node sends: DEVICE_PERSONALITY (117) | | |
|---|---|---|
| # Bytes | Field | Function |
| (1) | message_id | DEVICE_PERSONALITY |
| (1) | node_id | GSC node id |
| (1) | type | device type (CIM, MIM, etc) |
| (1) | assignment | device assignment (CIM1, . . . ) |

IV(xvi). Missed Channel Assignment/Drop

These messages are used to accumulate missed channel assignment/drop messages accrued from each MIM. When a MIM receives an unexpected channel-assignment or channel drop, it outputs one of the following messages. This allows the MOM PC to accumulate these counts and display them when status data is requested for the MIM in question.

| MIM node sends: MISSED_CA (138) MISSED_CD (139) | | |
|---|---|---|
| # Bytes | Field | Function |
| (1) | message_id | MISSED_CA or MISSED_CD |
| (1) | node_id | node id |
| (1) | site | MIM's associated site |
| (1) | channel | channel of missed assign/drop |

IV(xvii). Clear Status Errors

This message is sent to a node (CIM, MIM, CVMIM, MOM) from the MOM PC commanding that node to clear its status errors. The user at the MOM PC has observed the errors and decided they were not critical enough to replace the node in question. The user issues this command to clear past error messages and to allow the user to follow future errors. The node receiving this clear message will clear its errors and the next status update will show no errors at the status data screen. This also causes the node to stop blinking on the node configuration screen.

| MOM PC sends: CLEAR_STATUS_ERRORS (144) | | |
|---|---|---|
| # Bytes | Field | Function |
| (1) | message_id | CLEAR_STATUS_ERRORS |
| (1) | node_id | device's node id |

IV(xviii). System Time

This message is initiated from the MOM PC and is used to synchronize system time throughout the switch. It is transmitted periodically, approximately every three minutes, to the MOM controller. The MOM controller updates its system time with the new system time. In addition the MOM controller outputs system time updates every minute onto the GSC message bus to synchronize all nodes in the switch.

| MOM PC sends: SYSTEM_TIME (146) | | |
|---|---|---|
| # Bytes | Field | Function |
| (1) | message_id | SYSTEM_TIME |
| (2) | year | current year |
| (1) | month | current month |
| (1) | day | current day |
| (1) | hour | current hour |
| (1) | minute | current minute |
| (1) | second | current second |

IV(xvix). Conventional Control Messages

A unique data structure precedes all conventional control messages sen t on the GSC message bus throughout the switch. These messages are used to control the CVMIM, CIA and conventional base station. Each message has one of two message id's followed by a message sub id defining the actual message itself. This message format allows nodes in the system receiving the message, but not needing the conventional control message, to filter the conventional message through without having to switch on each individual message sub id.

IV(xx). Console User Profile Configuration

The following set of messages is used to configure each dispatch console in the system. The sequence is initiated from the MOM PC and allows the MOM PC user to provide an alias unit id and three shifts worth of operator specific data for each console.

a. Console User Profile Identification.

| MOM PC sends: CONSOLE USER PROFILE_ID (160) | | |
|---|---|---|
| # Bytes | Field | Function |
| (1) | message_id | CONSOLE_USER_PROFILE_ID |
| (1) | console | console |
| (8) | name | 8 character alias |
| (2) | unit_id | unit id | b. Console User Profile Shift Data

| MOM PC sends: CONSOLE_USER_PROFILE_SHIFT (161) (all three shifts) | | |
|---|---|---|
| # Bytes | Field | Function |
| (1) | message_id | CONSOLE_USER_PROFILE_SHIFT |
| (1) | console | console |
| (1) | shift | shift upper limit not spaced yet |
| (1) | priority | user priority |
| (1) | privilege | user privilege |
| (1) | def_unsel_vol | default unselect volume |
| (1) | non_mon_emerg_vol | non-monitored emergency volume |
| (1) | mute_vol | mute volume |
| (1) | all_mute_delay | all mute delay (seconds) |
| (1) | label_delay | label delay (seconds) |
| (1) | screen_blank_ (min) | screen blanker time-out timeout |
| (2) | bit_mask | various configuration bits (reference include file s_sys.h) | c. Console User Profile Return Status
Console responds with:

| CONSOLE_USER_PROFILE_RET_STATUS (162) | | |
|---|---|---|
| # Bytes | Field | Function |
| (1) | message_id | CONSOLE_USER_PROFILE_RET_STATUS |
| (1) | console | console |
| (1) | status | success/failure status |

IV(xxi). Trunked Audio Channel Configuration

The Trunked Audio Channel Configuration message is initiated from the MOM PC and is used to configure the trunked audio channels. Each channel may be configured individually. Each command is preceded by the following message group.

| MOM PC sends: AUDIO_CHAN_CONFIG_MSG (158) | | |
|---|---|---|
| # Bytes | Field | Function |
| (1) | msg_group | AUDIO_CHAN_CONFIG_MSG |

(a) Trunked Audio Transmit/Receive Level Configuration

The Trunked Audio Transmit/Receive Level Configuration message is initiated from the MOM PC and is used to adjust the transmit/receive gains for each audio channel, The SET_TX_GAIN and SET_RX_GAIN are used to set the gains to a specific level. The INC/DEC TX/RX GAIN are used to increment/decrement the current transmit/receive level.

| MOM PC sends: | SET_TX_GAIN (1) INC_TX_GAIN (2) DEC_TX_GAIN (3) SET_RX_GAIN (4) INC_RX_GAIN (5) DEC_RX_GAIN (6) | |
|---|---|---|
| # Bytes | Field | Function |
| (1) | msg_group | SET/INC/DEC_TX/RX_GAIN |

21
-continued

| (1) | channel | channel to configure |
|---|---|---|
| (1) | level | level to adjust to |
| (1) | node_id | originating node id |

| CIM/MIM/CVMIM responds with: | SET_TX_GAIN (1) |
|---|---|
| | INC_TX_GAIN (2) |
| | DEC_TX_GAIN (3) |
| | SET_RX_GAIN (4) |
| | INC_RX_GAIN (5) |
| | DEC_RX_GAIN (6) |

| # Bytes | Field | Function |
|---|---|---|
| (1) | msg_sub_group | SET/INC/DEC_TX/RX_GAIN |
| (1) | channel | channel configured |
| (1) | level | new level |
| (1) | node_id | responding node id |

(b) Trunked Audio Threshold Configuration The Trunked Audio Threshold Configuration message is initiated from the MOM PC and is used to adjust the threshold level for each audio channel. The SET_THRESHOLD is used to set the level to a specific value. The INC/DEC THRESHOLD is used to increment/decrement the current threshold level.

| MOM PC sends: | SET_THRESHOLD (7) |
|---|---|
| | INC_THRESHOLD (8) |
| | DEC_THRESHOLD (9) |

| # Bytes | Field | Function |
|---|---|---|
| (1) | msg_sub_group | SET/INC/DEC_THRESHOLD |
| (1) | channel | channel to configure |
| (1) | level | level to adjust to |
| (1) | node_id | originating node id |

| CIM/MIM/CVMIM | SET_THRESHOLD (7) |
|---|---|
| responds with: | INC_THRESHOLD (8) |
| | DEC_THRESHOLD (9) |

| # Bytes | Field | Function |
|---|---|---|
| (1) | msg_sub_group | SET/INC/DEC_THRESHOLD |
| (1) | channel | channel configured |
| (1) | level | new threshold |
| (1) | node_id | responding node id |

(c) Trunked Audio Tone Configuration

The Trunked Audio Tone Configuration message is initiated from the MOM PC and is used to enable/disable the 2175 Hz tone for each audio channel.

| MOM PC sends: | ENABLE_TONE (10) |
|---|---|
| | DISABLE_TONE (11) |

| # Bytes | Field | Function |
|---|---|---|
| (1) | msg_sub_group | ENABLE_DISABLE_TONE |
| (1) | channel | channel to configure |
| (1) | level | unused |
| (1) | node_id | originating node id |

| CIM/MIM/CVMIM | ENABLE_TONE (10) |
|---|---|
| responds with: | DISABLE_TONE (11) |

| # Bytes | Field | Function |
|---|---|---|
| (1) | msg_sub_group | ENABLE_DISABLE_TONE |
| (1) | channel | channel configured |
| (1) | level | unused |
| (1) | node_id | responding node id |

22

(d) Trunked Audio Notch Filter Configuration

The Trunked Audio Notch Filter Configuration message is initiated from the MOM PC and is used to enable/disable the notch filter for each audio channel.

| MOM PC SENDS: | ENABLE_NOTCH (12) |
|---|---|
| | DISABLE_NOTCH (13) |

| # Bytes | Field | Function |
|---|---|---|
| (1) | msg_sub_group | ENABLE_DISABLE_NOTCH |
| (1) | channel | channel to configure |
| (1) | level | unused |
| (1) | node_id | originating node id |

| CIM/MIM/CVMIM | ENABLE_NOTCH (12) |
|---|---|
| responds with: | DISABLE_NOTCH (13) |

| # Bytes | Field | Function |
|---|---|---|
| (1) | msg_sub_group | ENABLE_DISABLE_NOTCH |
| (1) | channel | channel configured |
| (1) | level | unused |
| (1) | node_id | responding node id |

IV(xxii). Program Logging Recorder

The following set of messages are used to program Logging Recorder Interfaces (LRIM) to the multisite switch. The sequence is initiated from the MOM PC and allows the MOM PC user to program UNITS, GROUPS, CONVENTIONAL CHANNELS, CONSOLES, and PHONE LINES to the LRIM for audio recording.

a. Login Request

The Login Request is used to log into the Logging Recorder. This will enable the MOM PC user to program the LRIM.

| # Bytes | Field | Function |
|---|---|---|
| | MOM PC sends: LOGIN (63) | |
| (1) | message_id | LOGIN |
| (1) | operator priority | priority of operator |
| (2) | operator_id | id of operator |
| (1) | privilege_level | assigned privilege level |
| (1) | module_volume | volume for unprogrammed calls |
| (1) | channel | channel for unprogrammed calls |
| | LRIM responds with: CALL_STAT (101) | |
| (1) | message_id | CALL_STAT |
| (1) | msg_group | LOGIN |
| (1) | msg_sub_group | message sub group (N/A) |
| (1) | call_variant | call variant bits (N/A) |
| (3) | callee | entity receiving call (N/A) |
| (3) | caller | entity initiating call (N/A) |
| (1) | status | request status (SUCCESS/FAILURE) |
| (1) | host | console # | b. LRIM Module Program Requests

The LRIM Program Commands are used for programming the LRIM. ADD_MODULE, DELETE_MODULE, SELECT_MODULE, and MODULE-VOLUME commands are supported.

| # Bytes | Field | Function |
|---|---|---|
| | MOM PC sends: ADD-MODULE (58) | |
| (1) | message_id | ADD_MODULE |
| (3) | callee | entity to add and type of |

-continued

| # Bytes | Field | Function |
|---|---|---|
| | | entity (UNIT, GROUP, CONV CHN, CONSOLE, PHONE LINE) |
| (1) | module_volume | volume level |
| (1) | channel | recorder channel |
| MOM PC sends: DELETE_MODULE (59) | | |
| (1) | message_id | DELETE_MODULE |
| (3) | callee | entity to delete and type (UNIT, GROUP, CONV CCHN, CONSOLE, PHONE LINE) |
| MOM PC SENDS: SELECT_MODULE (60) | | |
| (1) | message_id | SELECT_MODULE |
| (3) | callee | entity to select and type (UNIT, GROUP, CONV CCHN, CONSOLE, PHONE LINE) |
| (1) | channel | recorder channel |
| MOM PC sends: MODULE_VOLUME (61) | | |
| (1) | message_id | modify_MODULE |
| (3) | callee | entity for volume change and type (UNIT, GROUP, CONV CHN, CONSOLE, PHONE LINE) |
| (1) | module_volume | volume level |
| MOM PC sends: MODIFY_MOODULE (62) | | |
| (1) | message_id | MODIFY_MODULE |
| (3) | callee_delete | entity to delete and type (UNIT, GROUP, CONV CHN, CONSOLE, PHONE LINE) |
| (3) | callee_add | entity to add and type (UNIT, GROUP, CONV CHN, CONSOLE, PHONE LINE) |
| (1) | module_volume | volume level |
| (1) | channel | recorder channel |
| LRIM responds with: CALL_STAT (101) | | |
| (1) | message_id | CALL_STAT |
| (1) | msg_group | ADD_MODULE, DELETE_MODULE, SELECT_MODULE, MODULE_VOLUME, MODIFY MODULE |
| (1) | msg_sub_group | message sub group (N/A) |
| (1) | call_variant | channel of program request |
| (3) | callee | entity being programmed |
| (3) | caller | entity being deleted |
| (1) | status | request status (SUCCESS/FAILURE) |
| (1) | host | console # | c. Report LRIM Database

This command is used for reporting the LRIM database to the MOM PC. This will give the MOM PC user an update of the entities programmed at the LRIM.

| # Bytes | Field | Function |
|---|---|---|
| MOM PC sends: REPORT_LRIM_DATABASE (172) | | |
| (1) | message_id | REPORT_LRIM_DATABASE |
| LRIM responds with: CALL_STAT (101) | | |
| (1) | message_id | CALL_STAT |
| (1) | msg_group | ADD_MODULE |
| (1) | msg_sub_group | message sub group (N/A) |
| (1) | call_variant | channel of entity programmed |
| (3) | callee | entity programmed |
| (3) | caller | entity being deleted (N/A) |
| (1) | status | request status (SUCCESS/FAILURE) |
| (1) | host | console # |

The above presents a complete description of the messaging employed by the MOM.

V. Conclusion

While the invention has been described in what is considered to be the most practical and preferred embodiment, the invention is not to be limited to this embodiment. Rather, the invention covers various modifications and equivalent arrangements included within the spirit and scope of the appended claims.

What is claimed is:

1. In a radio frequency (RF) communications network with a plurality of digitally trunked RF sites interconnected by a multisite switch, each of the RF sites having a plurality of repeating transceivers and said RF sites each selectively broadcasting from said repeating transceivers a same RF voice communication on different trunked channels, wherein said multisite switch routes audio signals corresponding to said RF communication between said RF sites, said multisite switch comprising:

an interface module for connection to a system controller, said interface module passing messages from said system controller, through said multisite switch to said RF sites, said messages contain configuration messages regarding said trunked channels and are applied by said RF sites to configure the plurality of transceivers at each of said RF sites.

2. In a RF communications network as in claim 1, said interface module comprising a node in said multisite switch including a communications controller operatively coupled to said system controller and a message bus in said multisite switch, said message bus operatively coupled to nodes of said multisite switch interfacing with said RF sites.

3. In a RF communications network as in claim 1, wherein said configuration messages contain information for said RF sites to adjust transmit or receive gains for said trunked channels.

4. In an RF communications network with a plurality of digitally trunked RF sites interconnected by a multisite switch each of said RF sites having a plurality of repeating transceivers for communicating on trunked channels and capable of broadcasting a 2175 Hz tone, said multisite switch routing audio and data signals between said RF sites, said multisite switch comprising:

an interface module for connection to a system controller, said interface module passing configuration messages from said system controller, through said multisite switch to said RF sites, wherein said configuration messages contain information for said RF sites to enable or disable said 2175 Hz tone for broadcasting on said trunked channels by the sites.

5. In an RF communications network with a plurality of digitally trunked RF sites interconnected by a multisite switch, each of said RF sites having a plurality of repeating transceivers for communicating on trunked channels, said multisite switch routing audio signals between said RF sites, said multisite switch comprising:

an interface module for connection to a system controller, said interface module passing messages from said system controller, through said multisite switch to said RF sites, said messages contain configuration messages regarding said trunked channels and are applied by said RF sites to configure the plurality of transceivers at each of said RF sites, wherein said configuration messages contain information for said RF sites to enable or disable a notch filter in each of said sites for each of said trunked channels.

6. In a radio frequency (RF) communications network having a plurality of digitally trunked RF sites interconnected by a multisite switch, each of said RF sites having a plurality of repeating transceivers operating on trunked channels and said RF sites selectively transmitting from said transceivers a same RF voice communication on a plurality of said trunked channels operating at different frequencies, said multisite switch routing audio and data signals corresponding to said same RF communication between said RF sites, said multisite switch comprising:

a plurality of nodes interfacing with said RF sites, said nodes communicating messages to other nodes;

a message bus operatively coupled to each node for conveying said messages between nodes; and a controller node interface coupled to said message bus and having means for logging said messages.

7. In a RF communications network as in claim 6, said means for logging messages comprising a data log buffer.

8. In a RF communications network as in claim 6, said means for logging messages further comprises means for designating said messages by time.

9. In a RF communications network as in claim 6, said means for logging messages further comprises means for conveying said logged messages to said system controller.

10. In a RF communications network having a plurality of digitally trunked RF sites interconnected by a multisite switch, each of said RF sites having a plurality of repeating transceivers operating on trunked channels, said multisite switch routing audio and data signals between said RF sites for transmission from said transceivers, said multisite switch comprising:

a plurality of nodes interfacing with said RF sites, said nodes communicating messages to other nodes;

a message bus operatively coupled to each node for conveying said messages between nodes;

a controller node operatively coupled to said message bus and having means for logging said messages, wherein said means for logging messages further comprises means for reducing the traffic volume of messages on said message bus upon detecting a predetermined high traffic condition on said message bus.

11. In a radio frequency (RF) communications network with a plurality of digitally trunked RF sites interconnected by a multisite switch, each of said RF sites having a plurality of repeating transceivers operating on trunked channels and where said sites selectively transmit from said transceivers a same RF voice communication on different channels, wherein each transceiver includes channel configuration data indicative of one of the channels, said multisite switch routing audio signals between said RF sites, said multisite switch comprising:

a plurality of nodes and each one said nodes interfaces with a distinct one of said RF sites wherein said sites sends channel configuration data to said nodes; and a controller node interface to a system controller and operatively coupled to said nodes, said controller node interface having means for receiving from said nodes channel configuration data and means for conveying channel configuration data to said system controller.

12. In a radio frequency (RF) communications network with a plurality of digitally trunked RF sites interconnected by a multisite switch, each of said RF sites having a plurality of repeating transceivers each operating on trunked channels, wherein a plurality of said sites selectively transmit from said transceivers a same RF voice communication on different trunked channels, and said a multisite switch routing audio signals between said RF sites, said multisite switch comprising:

nodes interfacing with said RF sites, to convey a video signal between the multisite switch and RF sites;

a plurality of audio buses operatively coupled to said nodes and conveying audio signals between said nodes, said nodes each having one or more assigned audio buses for transmitting audio signals to other nodes; and a controller node interface operatively coupled to said nodes, said controller node interface operatively having means for assigning said assigned audio buses to individual nodes.

\* \* \* \* \*